(12) United States Patent
Harris et al.

(10) Patent No.: US 7,917,423 B2
(45) Date of Patent: Mar. 29, 2011

(54) SYSTEMS AND METHODS FOR MONITORING CREDIT OF TRADING COUNTERPARTIES

(75) Inventors: Stewart Harris, Marlboro, NJ (US); Azucena De Latorre, Staten Island, NY (US); Aniruddha Deb, Clearwater, FL (US); Janna Turetsky, Wayne, NJ (US)

(73) Assignee: BGC Partners, Inc., New York, NY (US)

( * ) Notice: Subject to any disclaimer, the term of this patent is extended or adjusted under 35 U.S.C. 154(b) by 1690 days.

(21) Appl. No.: 09/755,591

(22) Filed: Jan. 5, 2001

(65) Prior Publication Data

US 2002/0032635 A1 Mar. 14, 2002

Related U.S. Application Data

(60) Provisional application No. 60/174,896, filed on Jan. 6, 2000.

(51) Int. Cl.
*G06Q 40/00* (2006.01)

(52) U.S. Cl. ........................... 705/37; 705/38

(58) Field of Classification Search ............... 705/35–40
See application file for complete search history.

(56) References Cited

U.S. PATENT DOCUMENTS

| | | | | |
|---|---|---|---|---|
| 4,674,044 A | 6/1987 | Kalmus et al. | ............... | 364/408 |
| 4,823,265 A | 4/1989 | Nelson | ............... | 364/408 |
| 4,903,201 A | 2/1990 | Wagner | ............... | 364/408 |
| 5,038,284 A | 8/1991 | Kramer | ............... | 364/408 |
| 5,136,501 A * | 8/1992 | Silverman et al. | ............... | 705/37 |
| 5,161,103 A | 11/1992 | Kosaka et al. | ............... | 364/408 |
| 5,168,446 A * | 12/1992 | Wiseman | ............... | 705/37 |
| 5,258,908 A | 11/1993 | Hartheimer et al. | ............... | 364/408 |
| 5,267,148 A | 11/1993 | Kosaka et al. | ............... | 364/408 |
| 5,270,922 A | 12/1993 | Higgins | ............... | 364/408 |
| 5,297,031 A | 3/1994 | Gutterman et al. | ............... | 364/408 |
| 5,724,524 A | 3/1998 | Hunt et al. | ............... | 395/237 |
| 5,802,499 A | 9/1998 | Sampson et al. | ............... | 705/35 |
| 5,809,483 A | 9/1998 | Broka et al. | ............... | 705/37 |
| 5,893,079 A | 4/1999 | Cwenar | ............... | 705/36 |
| 5,924,083 A | 7/1999 | Silverman et al. | ............... | 705/37 |

(Continued)

FOREIGN PATENT DOCUMENTS

CA 2305736 4/1999

(Continued)

OTHER PUBLICATIONS

Canadian Office Action for Application No. 2396264 dated Dec. 8, 2009; 3 pages.

*Primary Examiner* — Thu Thao Havan
(74) *Attorney, Agent, or Firm* — Glen R. Farbanish

(57) ABSTRACT

Systems and methods are provided which monitor trades entered into and cleared by counterparties, track the net and gross positions of counterparties and the counterparties' parent entities, trigger warnings when counterparties or their parent entities exceed a warning limit, and shut-off counterparties' trading ability when counterparties exceed a credit limit. An operator of a credit system using these systems and methods is provided with a variety of interfaces through which the operator can set up new counterparties, search a list of counterparties, view and edit basic information for counterparties, view financial information for counterparties, view and edit notes regarding to counterparties, view and edit limits of counterparties, view position versus limit information for counterparties, view the current day's position information for counterparties, and view cumulative position information for counterparties.

43 Claims, 21 Drawing Sheets

U.S. PATENT DOCUMENTS

| | | | | |
|---|---|---|---|---|
| 6,058,417 | A | 5/2000 | Hess et al. | 709/219 |
| 6,317,727 | B1 * | 11/2001 | May | 705/36 R |
| 6,321,212 | B1 * | 11/2001 | Lange | 705/37 |
| 6,421,653 | B1 * | 7/2002 | May | 705/37 |
| 6,477,513 | B1 * | 11/2002 | Walker et al. | 705/76 |
| 7,155,409 | B1 * | 12/2006 | Stroh | 705/37 |

FOREIGN PATENT DOCUMENTS

| | | |
|---|---|---|
| EP | 0 873 549 B1 | 10/1998 |
| WO | WO 99/26173 | 5/1999 |
| WO | WO 00/16224 | 3/2000 |

* cited by examiner

EDIT BASIC INFORMATION FOR COUNTERPARTY

BASIC INFORMATION — 402
- COUNTERPARTY ID: 1788 — 422
- COUNTERPARTY NAME: REPUBLIC TRADING    CREDIT STATUS: FROZEN — 424
- SHORT NAME: RETRADE — 428 — 426
- DATE FORMED: 01/00/0000    RPT CNTRY CDE: TOGO — 432
- TAX NBR: 123 456 7890 — 434    NBR BRANCHES: 9 — 436
- TYPE: ○ PARENT ◉ LEGAL ENTITY — 438
- ☒ PARENT NAME: REPUBLIC HOLDINGS — 440
- DATE MODIFIED: 08/12/1999 17:01:11  USER MODIFIED: JJONES — 444, 446

ADDRESS INFORMATION — 408
- TYPE: CREDIT MAILING
- ADDR STREET1: 1 MAIN STREET
- ADDR STREET2: SUITE 100
- CITY: NEW YORK
- STATE: NY  POSTAL CODE: 10001
- COUNTRY: UNITED STATES
- GEO REGION: NORTH AMERICA

— 442

CONTACT INFORMATION — 404
- NAME: JOHN SMITH    DEPT: ACCOUNTING
- PHONE: 555 - 1234    TITLE: VP

PARENT INFORMATION — 406
- PARENT ID: 1661 — 448    CLASSIFICATION: HOLDINGS COMPANY — 450
- PARENT NAME: REPUBLIC HOLDINGS — 452
- STATE: — 454    COUNTRY: ITALY — 456
- GEO.REGION: EUROPE — 458

DESCRIPTOR INFORMATION
- CLASSIFICATION    PRIMARY DEALER — 410

LINK TO:
[ SAVE ] — 412  [ CONTACT ] — 414  [ ADDRESS ] — 416  [ DESCRIPTOR ] — 418  [ CLOSE ] — 420

FINANCIAL STATEMENTS
REPUBLIC TRADING

STATEMENT LIST

| ID STMNT | DT STMNT | STMNT STATUS | CRNCY | ID USER | DT MODIFIED |
|---|---|---|---|---|---|
| 65 | 12/22/1999 | AUDITED | USD | VCOUGHLI | 12/22/1999 16:10:30 |

← 902

906

STATEMENT DETAIL

STATEMENT ID: 65   STMNT DT: 12/22/1999
DT MODIFIED: 12/22/1999 16:10:30   STATUS: AUDITED
USER ID: VCOUGHLI   CURRENCY: USD

| | |
|---|---|
| CASH/CASH EQUIVALENTS | 66,000 |
| SECURITIES OWNED | 88,000 |
| SECURITIES BORROWED | 77,000 |
| REVERSE REPOS | 55,666 |
| RECEIVABLE FROM B/D | 76,576 |
| FAILED TO DELIVER | 999 |
| RECEIVABLE - OTHER | 6,777 |
| REPO | 9,999 |
| SECURITIES LOANED | 8,888 |
| BANK LOANS | 7,777 |
| PAYABLE TO B/D | 7,654 |
| PAYABLE TO CLEARING AGENT | 33 |
| | 555 |
| LESS TREASURY STOCK | 666 |

← 904

☐ SHOW ALL
☐ CREATE ACC STMNT
☐ MODIFY ACC STMNT ORDER

[SAVE] [MODIFY] [NEW] [PRINT] [CLOSE]
  908      910      912    914     916

| ENTER LIMIT | | |
|---|---|---|
| LIMIT SUBCATEGORY: | US TREASURY ▽ | |
| CURRENT LIMIT TYPE: | PRESUMED STLM | |
| | PRESUMED STLM ← 1402 | |
| LBE NET LIMIT: | 30,000,000 | ☐ MAX |
| LBE GROSS LIMIT: | 60,000,000 | ☐ MAX |
| VAR GROSS LIMIT: | 0 | ☐ MAX |
| VAR NET LIMIT: | 0 | ☐ MAX |
| MTM GROSS LIMIT: | 0 | ☐ MAX |
| MTM NET LIMIT: | 1,000,000 | ☐ MAX |
| PRINCIPAL GROSS LIMIT: | 0 | ☐ MAX |
| PRINCIPAL NET LIMIT: | 0 | ☐ MAX |
| ID CURRENCY: | USD ▽ | |
| INTAL WARNING LEVEL: | 70 % | |
| WARNING INTERVAL: | 10 % | |
| IND LIQUIDATE: | ⦿ YES ○ NO | |
| IND SHUT OFF: | ⦿ YES ○ NO | |
| USER MODIFIED: | ADELATOR | |
| DATE MODIFIED: | 08/10/1999 16:20:17 | |

SAVE   CLOSE

FIG. 15

POSITION VS LIMIT

| LIMIT CATEGORY | LIMIT SUBCAT | OPTIONS | REFRESH |
|---|---|---|---|
| US DEBT MARKETS — 1504 | US TREASURY CX FUTURES — 1506 1510 1508 | ● SELECT ALL ○ UNSELECT ALL | ● MANUAL [REFRESH] ○ AUTO EVERY [30▼] SEC — 1514 |

POSITION VS LIMIT — 1500      DATE 12/09/1999 14:04:07   PAGE 1 OF 1      [RETRIEVE] — 1512

| CNTRPTY | NAME | LIMIT TYPE | NEW LIMIT TYPE | LIMIT SUBCAT | SHUT OFF | % INIT | QTY | LBE NET POSITION | LBE NET LIMIT | % LBE NET |
|---|---|---|---|---|---|---|---|---|---|---|
| 1788 | REPUBLIC TRADING | PRESUM STLMT | PRESUM STLMT ▽ | CX FUTURES | ☐ | 70 | 400,000,000 | 40,000,000 | 200,000,000 | 20.00 |

↑ 1502

ROW COUNT [1]

[ACCOUNT] — 1516    [TRANSACTION] — 1518    [PRINT]    [CLOSE] — 1520

| POSITION VS LIMIT ACCOUNT DETAIL | | | | | | | | |
|---|---|---|---|---|---|---|---|---|
| READY TRADE | | | | | | | | |
| ACCOUNT LEVEL POSITION VS. LIMIT FOR CX FUTURES DATE: 12/22/1999 16:38:41 PAGE 1 OF 1 | | | | | | | | |
| ACCOUNT # | ACCOUNT NAME | ACTIVE | SHUT OFF | %INIT | QUANTITY | LBE NET POSITION | LBE NET LIMIT | %LBE NET | LBE GROSS POSITION | LBE GROSS LIMIT |
| TOTAL: | | | | | 101 | -7,795,276 | | | 7,952,756 | |
| 9589 | ELECTRONIC 9589 | ☒ | ☐ | | 50 | -3,937,008 | | 0.00 | 3,937,008 | |
| 9587 | ELECTRONIC 9587 | ☒ | ☐ | | 51 | -3,858,268 | | 0.00 | 4,015,748 | |

ROW COUNT 2    PRINT  EXPORT  CLOSE

*FIG. 16*

POSITION VS LIMIT
READY TRADE — 1704

CX FUTURES: LIMIT VS POSITION TRANSACTIONS  DATE: 12/22/1999 16:37:19  PAGE 1 OF 1

| ACCOUNT ID | ID SECURITY | NM SECURITY | QUANTITY | LBE | PRINCIPAL | PRICE | MTM VAR | TRADE ID | ORGTR | TR ROOM | BUY/SELL | STAT | FAIL |
|---|---|---|---|---|---|---|---|---|---|---|---|---|---|
| TOTAL: | | | 101 | -7,795,276 | 10,000 | | | | | | | | |
| 9587 | 8 199906 | | 25 | -1,968,504 | 2,475 | 99.0000 | | 19991014011692000002 | 2 | | SE | HD | ELE |
| 9587 | 8 199906 | | 25 | -1,968,504 | 2,475 | 99.0000 | | 19991014011693000002 | 2 | | SE | HD | ELE |
| 9589 | 8 199906 | | 25 | -1,968,504 | 2,475 | 99.0000 | | 19991014011694000002 | 2 | | SE | HD | ELE |
| 9589 | 8 199906 | | 25 | -1,968,504 | 2,475 | 99.0000 | | 19991014011695000002 | 2 | | SE | HD | ELE |
| 9587 | 8 199906 | | 1 | 78,740 | 100 | 100.3438 | | 19991014011690000001 | 2 | | BU | HD | ELE |

1702

ROW COUNT  5

PRINT  EXPORT  CLOSE — 1706

| | SELECT LIMIT CAT | | SUBCAT LIST | | OPTIONS | | | REFRESH | |
|---|---|---|---|---|---|---|---|---|---|
| | US DEBT MARKETS ▽ | | US TREASURY<br>CX FUTURES | | ● SELECT ALL<br>○ UNSELECT ALL<br>RETRIEVE | | | ● AUTOMATIC EVERY 30 ⇕ GO<br>○ MANUAL | |

TODAY'S POSITION    DATE: 12/22/1999  16:44:21  PAGE 1 OF 18

| ID<br>CNTPTY | COUNTERPARTY<br>NAME | LIMIT<br>SUBCATEGORY | QUANTITY | LBE NET<br>POSITION | LBE GROSS<br>POSITION | LBE LONG<br>POS | LBE SHORT<br>POS | VAR NET<br>POSITION |
|---|---|---|---|---|---|---|---|---|
| | TOTAL: | | 35,452 | | 02,984,722,799 | 1,492,361,400 | 1,492,361,400 | 0 |
| 1784 | READY TRADE | CX FUTURES | 101 | -7,795,276 | 7,952,756 | 78,740 | 7,874,016 | 0 |

ROW COUNT  1

[ACCOUNT]  [TRANSACTION]  [PRINT]  [CLOSE]

FIG. 18

TODAY'S ACCOUNT POSITION

READY TRADE

TODAY'S ACCOUNT POSITION FOR CX FUTURES  DATE: 12/22/1999  16:45:24  PAGE 1 OF 1

| ACCT# | ACCOUNT NAME | ACTIVE | QTY | LBE NET | LBE GROSS | LONG POS | SHORT POS | MTM NET |
|---|---|---|---|---|---|---|---|---|
| TOTAL: | | | 101 | -7,795,276 | 7,952,756 | 78,740 | 7,874,016 | |
| 9587 | ELECTRONIC 9587 | ☑ | 51 | -3,858,268 | 4,015,748 | 78,740 | 3,937,008 | |
| 9589 | ELECTRONIC 9589 | ☑ | 50 | -3,937,008 | 3,937,008 | 0 | 3,937,008 | |

ROW COUNT  2

PRINT   EXPORT   CLOSE

CUMULATIVE POSITION

LIMIT CATEGORY — US DEBT MARKETS — 2004

LIMIT SUBCATEGORY — US TREASURY / CX FUTURES — 2006

OPTIONS: ● SELECT ALL  ○ UNSELECT ALL

REFRESH: ● AUTOMATIC EVERY 30 ⇔ GO   ○ MANUAL

RETRIEVE

CUMULATIVE POSITION  DATE: 12/22/1999 16:44:58  PAGE 1 OF 86

| ID CNTPTY | COUNTERPARTY NAME | LIMIT SUBCATEGROY | QUANTITY | LBE NET POSITION | LBE GROSS POSITION | LBE LONG POS | LBE SHORT POS | VAR NET POSITION |
|---|---|---|---|---|---|---|---|---|
| | TOTAL: | | 3,802,635,452 | 181,028,943 | 5,632,923,827 | 2,906,976,385 | 2,725,947,442 | 0 |
| 606 | READY TRADE | US TREASURY | 45,000,000 | -1,562,500 | 23,437,500 | 10,937,500 | 12,500,000 | 0 |

ROW COUNT 20

ACCOUNT — 2008   TRANSACTION   PRINT   CLOSE — 2010

CUMULATIVE ACCOUNT POSITION

READY TRADE

CUMULATIVE ACCOUNT POSITION FOR US TREASURY DATE: 12/22/1999 16:48:09 PAGE 1 OF 1

| ACCT# | ACCOUNT NAME | ACTIVE | QTY | LBE NET | LBE GROSS | LONG POS | SHORT POS | MTM NET |
|---|---|---|---|---|---|---|---|---|
| TOTAL: | | | 45,000,000 | -1,562,500 | 23,437,500 | 10,937,500 | 12,500,000 | |
| 9991 | BOB | ☑ | 15,000,000 | -1,562,500 | 7,812,500 | 3,125,000 | 4,687,500 | |
| 1031 | MIKE | ☑ | 30,000,000 | 0 | 15,625,000 | 7,812,500 | 7,812,500 | |

ROW COUNT 2

PRINT  EXPORT  CLOSE

FIG. 21

SYSTEMS AND METHODS FOR MONITORING CREDIT OF TRADING COUNTERPARTIES

CROSS REFERENCE TO RELATED APPLICATION

This application claims the benefit of U.S. Provisional Patent Application No. 60/174/896, filed Jan. 6, 2000, which is hereby incorporated by reference herein in its entirety.

BACKGROUND OF THE INVENTION

The present invention relates to systems and methods for monitoring credit of trading counterparties. More particularly, the present invention relates to systems and methods for monitoring credit of trading counterparties that enable trading systems and credit managers to monitor credit of trading counterparties and thereby control the risk that the trading system and the trading counterparties are exposed to.

In recent years, electronic trading systems have gained wide spread acceptance for trading of a wide variety of items, such as goods, services, financial instruments, and commodities. For example, electronic trading systems have been created which facilitate the trading of financial instruments and commodities such as stocks, bonds, currency, futures, oil, gold, pork bellies, etc. As another example, online auctions on the Internet have become popular markets for the exchange of services and both new and used goods.

Trading systems are frequently operated by individual traders in order to effect trades for legal entities with which they are employed. For example, a bank may employ various traders who participate in trading in the bond market. In trading system, both the traders and the banks may each maintain a trading account, and thus each is a counterparty in the trading systems. Similarly, a holding company may own several banks, and each bank may employ several traders. As above, the holding company may also maintain a trading account, and thus the holding company is also a counterparty in the trading system. The accounts that are held may follow the same type of structural hierarchy. For example, the holding company may have a trading account, each bank may have a sub-account of the holding company's account, and each trader may have a sub-account of their bank's account. In the context of this invention, a customer of a trading system may be any person or entity holding one or more trading accounts and may be also referred to as a counterparty. For example, the holding company may hold its own account as well as the accounts of its banks, and each bank may hold its own account as well as the accounts of its traders. Also in the context of this invention, the holding company is the parent entity of the banks and the banks are the parent entities of their traders.

Many of these electronic trading systems use a bid/offer process in which bids and offers are submitted to the systems by a passive side and then those bids and offers are hit and lifted (or taken) by an aggressive side. For example, a passive trading counterparty may submit a "bid" to buy a particular number of 30 Year U.S. Treasury bonds at a given price. In response to such a bid, an aggressive side counterparty may submit a "hit" in order to indicate a willingness to sell bonds to the first counterparty at the given price. Alternatively, a passive side counterparty may submit an "offer" to sell the particular number of the bonds at the given price, and then an aggressive side counterparty may submit a "lift" (or "take") in response to the offer to indicate a willingness to buy bonds from the passive side counterparty at the given price.

When trades are entered into by one counterparty submitting a bid or offer and another counterparty hitting or lifting the bid or offer, respectively, a binding contract between the counterparties is entered into. Part of that contract requires that the counterparties each deliver money, goods, and/or services. For example, if a first counterparty bids to buy $100 million in 30 year U.S. Treasury bonds, and a second counterparty hits the bid, the first counterparty has to deliver $100 million in cash and the second counterparty has to deliver the 30 year U.S. Treasury bonds within a predetermined clearing time. This process is referred to as a trade clearing.

Because counterparties have the potential to lose money when trades do not clear because of subsequent changes in market conditions, counterparties frequently desire to, and are frequently required by their parent entities to, limit their risk exposure. One way in which risk exposure can be limited is to place a monetary limit on the amount of trades that can be made in one day. This limit is referred to as a credit limit. The monetary total amount of trades that may be made is referred to as the credit available to the counterparty, and the monetary total amount of trades that have been entered into so far is referred to as the position of the counterparty.

Accordingly, it is an object of the present invention to provide systems and methods for monitoring credit of trading counterparties.

SUMMARY OF THE INVENTION

In accordance with this and other objects of the invention, systems and methods for monitoring credit of trading counterparties are provided. More particularly, the present invention is systems and methods for monitoring credit of trading counterparties that enable trading systems and credit managers to monitor credit of trading counterparties and thereby control the risk that the trading system and the trading participant are exposed to. In one aspect of the present invention, the systems and methods monitor trades entered into and cleared by counterparties, track the net and gross positions of counterparties and the counterparties' parent entities, trigger warnings when counterparties or their parent entities exceed a warning limit, and shut-off counterparties' trading ability when counterparties exceed a credit limit. In another aspect of the present invention, an operator of a credit system is provided with a variety of interfaces through which the operator can set up new counterparties, search a list of counterparties, view and edit basic information for counterparties, view financial information for counterparties, view and edit notes regarding counterparties, view and edit limits of counterparties, view position versus limit information for counterparties, view the current day's position information for counterparties, and view cumulative position information for counterparties.

BRIEF DESCRIPTION OF THE DRAWINGS

Further features of the invention, its nature and various advantages will become more apparent from the following detailed description of the invention, taken in conjunction with the accompanying drawings, in which like reference characters refer to like parts throughout, and in which:

FIGS. 4-21 are illustrations of various credit processor operator interfaces that may be presented in accordance with various embodiments of the present invention.

DETAILED DESCRIPTION OF THE INVENTION

Figure 1:
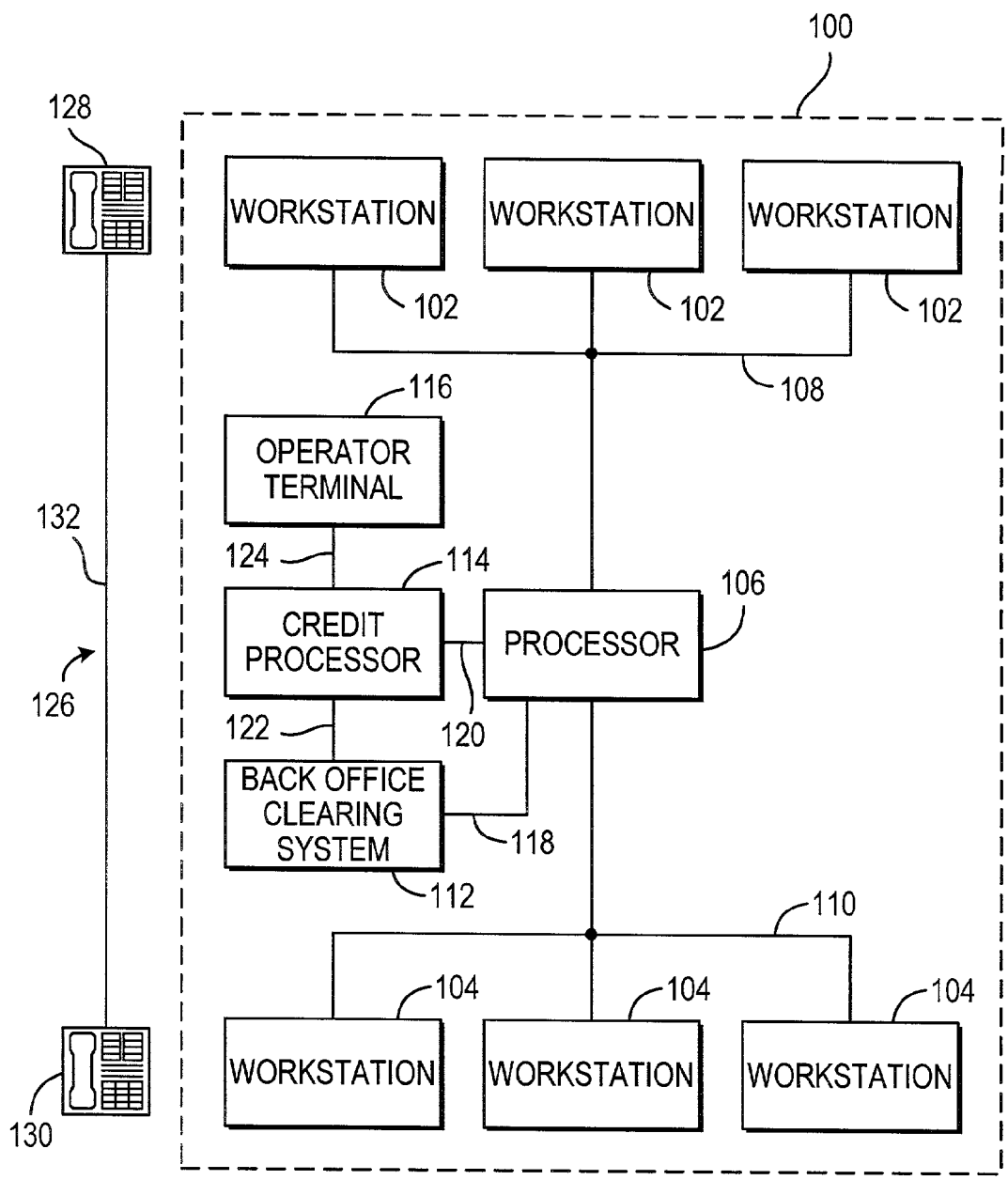
FIG. 1 is a block diagram of hardware that may be used to implement various embodiments of the present invention.

The present invention is now described in connection with FIGS. 1-21. Turning first to FIG. 1, an example of hardware 100 that may be used to implement one embodiment of the present invention is shown. As illustrated, hardware 100 may include one or more local workstations 102 and one or more remote workstations 104 that may be used by counterparties to view trading data and enter trading commands. Workstations 102 and 104 may be any suitable means for presenting data and, in preferred embodiments of this invention, accepting input. For example, workstations 102 and 104 may be personal computers, laptop computers, mainframe computers, dumb terminals, data displays, Internet browsers, Personal Digital Assistants (PDAs), two-way pagers, wireless terminals, portable telephones, etc., or any combination of the same.

To orchestrate trading between counterparties using workstations 102 and 104, the workstations preferably submit commands to, and receive data to be displayed from, a processor 106. In alternative embodiments, however, workstations may communicate with additional processors, or include processors to orchestrate trading in a distributed fashion without requiring processor 106. In yet other embodiments, processor 106 may be connected to an external trading system (not shown) that controls trading by the counterparties. Processor 106, and any additional processors, may be any suitable circuitry or devices capable of processing data such as microprocessors, personal computers, network servers, mainframe computers, dedicated computer systems, etc.

As shown, processor 106 may be connected to workstations 102 and 104 by networks 108 and 110, respectively. Each of networks 108 and 110 may be any suitable data network for communicating data between workstations 102 and 104 and processor 106, such as a local area network, a wide area network, the Internet, an intranet, a wireless network, a hard wired connection, a dial-up network, etc., or any combination of the same. In an arrangement of hardware 100 without processor 106, workstations 102 and 104 may be linked together by networks 108 and 110 directly.

Workstations 102 and 104, processor 106, and networks 108 and 110 may collectively form a trading system.

As also shown in FIG. 1, a telephone network 126 may be provided that comprises a local telephone 128 and a remote telephone 130 connected by a telephone line 132. Telephone network 126 may be used to enable a counterparty at a remote location to communicate with a broker-counterparty at a workstation 102 or 104. This may be useful when the counterparty does not have access to a workstation 102 or 104 or when the counterparty only has access to a display-only workstation 102 or 104. Obviously, telephone network 126 may be implemented as a private telephone network, a public telephone network, a wireless telephone network, or any suitable combination of the same.

When used to implement a bid/offer, hit/take trading system as described above or connect to an external bid/offer, hit/take trading system, hardware 100 may enable a counterparty to submit a bid to buy, or an offer to sell, an item at one of workstations 102 and 104. This bid or offer may then be communicated to processor 106, where the bid or offer can be ranked and stored in a bid-offer queue. The ranking may be based upon time of submission, price, or any other suitable criterion. The bid or offer may then be presented to other counterparty via other workstations 102 and 104 dependent upon its ranking in the bid-offer queue. Once displayed, the bid or offer can then be hit or taken by one or more of the other counterparty so that a trade of the item can proceed to execution.

A back office clearing system 112 and a credit processor 114 may also be connected to processor 106 of the trading system via communication links 118 and 120, respectively. Clearing system 112 may be any suitable equipment, such as a computer, or combination of the same, for causing trades to be cleared and/or verifying that trades are cleared. Credit processor 114 may be any suitable equipment, such as a computer, or combination of the same, for monitoring and controlling credit as described hereinbelow. Credit processor 114 may be controlled by one or more operator terminals 116 via communication link 124, and/or by workstations 102 and 104 via networks 108 and 110 and processor 106. Operator terminals 116 may be any suitable circuitry or devices capable of providing a control interface for credit processor 114 such as microprocessors, personal computers, network servers, mainframe computers, dedicated computer systems, dumb terminals, computer monitor and keyboard, etc. Clearing system 112 may communicate with credit processor 114 via communication link 122, and communication links 118, 120, 122, and 124 may be any suitable data network for communicating data, such as a local area network, a wide area network, the Internet, an intranet, a wireless network, a hard wired connection, a dial-up network, etc., or any combination of the same.

Figure 2:
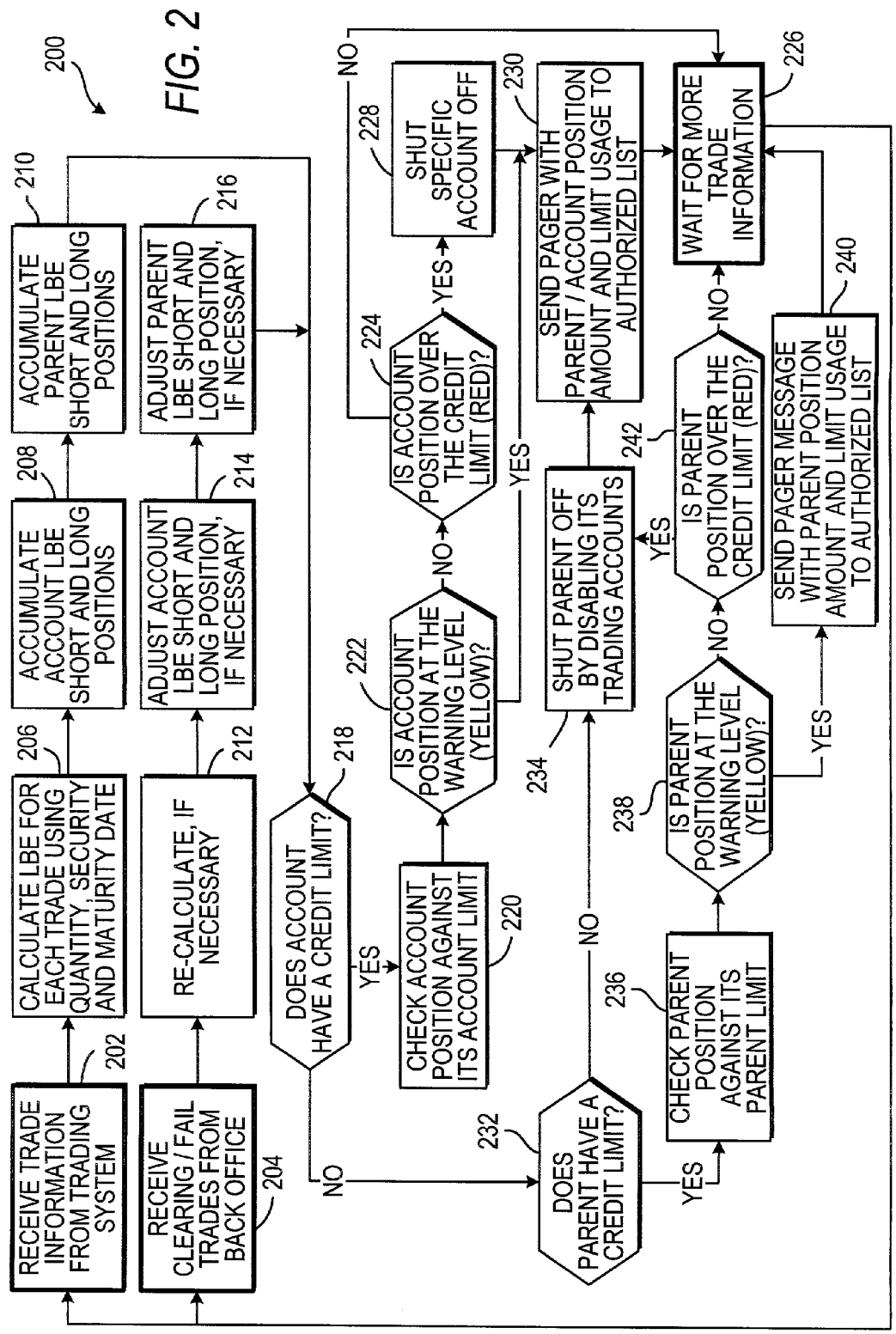
FIG. 2 is a flow diagram of a credit monitoring process in accordance with various embodiments of the present invention.

Turning to FIG. 2, an example of a process 200 that may be executed in credit processor 114 is illustrated. As shown, at steps 202 and 204, trade information may be received from processor 106 of the trading system and back office clearing system 112. The trade information from processor 106 may include the price, size, and item to be traded in connection with trades entered into by each counterparty. The trade information from clearing system 112 may include price, size, and item that was supposed to be traded in connection with trades that cleared or failed to clear for each counterparty. The trading information may be received at credit processor 114 as soon as the information is available or may be periodically received in batches.

After receiving trade information from processor 106 at step 202, process 200 may calculate the long-bond-equivalent for each trade based upon the size (e.g., quantity) and type (e.g., security and maturity) of the item to be traded at step 206. The long-bond-equivalent (LBE) is a metric that is used to convert that values of various types of trades to a uniform scale and is based on the value of a long bond (i.e., a 30 year U.S. Treasury Bond). Although long-bond-equivalents are used to illustrate the invention, any suitable metric may be used to implement the invention. Next, at step 208, process 200 may accumulate the LBE short and long positions for each counterparty account corresponding to the received information. A long position is a position wherein a counterparty agrees to buy an item and a short position is a position wherein a counterparty agrees to sell an item. Next at step 210, process 200 may accumulate the LBE short and long positions for all accounts of each parent entity having counterparties corresponding to the received information.

After receiving trade information from clearing system 112 at step 204, process 200 may recalculate the long-bond-equivalent for each trade based upon the size (e.g., quantity) and type (e.g., security and maturity) of the item traded at step 212, if necessary. Next, at step 214, process 200 may adjust the LBE short and long positions for each counterparty account corresponding to the received information, if necessary. Where a trade has cleared, for example, the counterparty account may be deducted by the amount of the trade to reflect that the trade is no longer "on credit." Next at step 216, process 200 may adjust the LBE short and long positions for all accounts of each parent entity having counterparties corresponding to the received information, if necessary.

Upon completing step 210 or step 216, process 200 may next determine at step 218 whether the counterparty accounts corresponding to the information have credit limits. For each account having a credit limit, process 200 may next check the account position against its account limit at step 220. The account's position is preferably the value accumulated at steps 208 and 214. Next, at step 222, process 200 determines if the account's position is within the warning level range for the account. The warning level range is a range in which a counterparty, credit manager, trading system administrator, or anyone or anything else may be warned that the account is approaching its limit. If the account's position is not within the warning level range, then process 200 determines if the account's position is over its credit limit at step 224. If the account's position is not over its credit limit, then process 200 proceeds to step 226 to wait for more information from processor 106 or clearing system 112. Otherwise, if the account position is over its credit limit, process 200 may shut off the account at step 228. Finally, after shutting off the account at step 228, or if the account is determined to be within the warning level range at step 222, process 200 may send a message, at step 230, to one or more pagers of designated persons with information relating to the account, such as account number, position, and limit, and then wait for more trade information at step 226.

If process 200 determines at step 218 that the account does not have a credit limit, however, then process 200 proceeds to step 232 where it determines whether the parent entity having the counterparty corresponding to the account has a credit limit. This limit would encompass an account limit for the account if one existed. If process 200 determines at step 232 that the parent entity does not have a credit limit, then process 200 may shut off the parent entity and all of its counterparties by disabling their trading accounts at step 234. After shutting off these accounts at step 234, process 200 may send a message, at step 230, to one or more pagers of designated persons with information relating to the accounts, such as account numbers, positions, and limits, and then wait for more trade information at step 226.

If process 200 determines at step 232 that the parent entity does have a credit limit, however, process 200 may then check the parent entity's position against its credit limit at step 236. The parent entity's position is preferably the value accumulated at steps 210 and 216. Next, at step 238, process 200 may determine whether the parent entity's position is within the warning level range for that entity. If the parent entity's position is within the warning level range, then process 200 may send a message, at step 240, to one or more pagers of designated persons with information relating to the parent entity, such as counterparty number, position, and limit, and then wait for more trade information at step 226.

If process 200 determines at step 238 that the parent entity's position is not within the warning level range, then process 200 may determine at step 242 whether the parent entity's position is over the parent entity's credit limit. If the parent entity's position is over its credit limit, then process 200 may shut off the parent entity and all of its counterparties by disabling their trading accounts at step 234 and send a message to one or more pagers of designated persons with information relating to the accounts, such as account numbers, positions, and limits, at step 230. After sending a message at step 230, of if process 200 determines at step 242 that the parent entity's position is not over its credit limit, process 200 may wait for more trade information at step 226.

Figure 3:
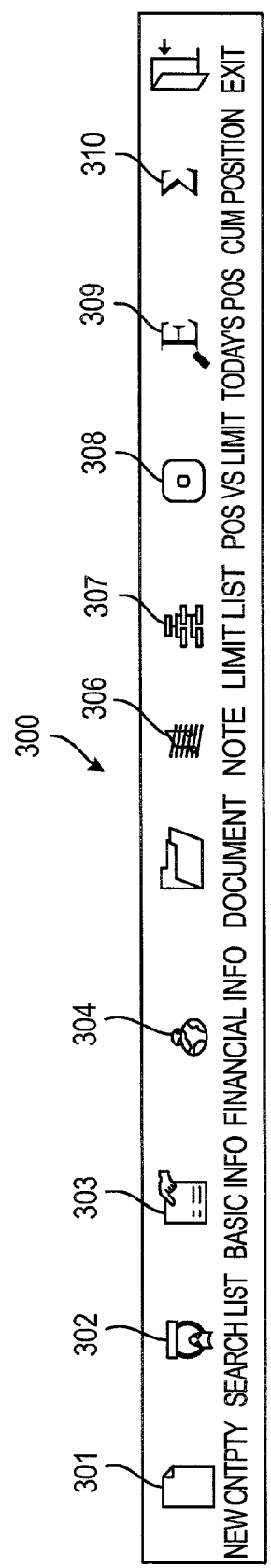
FIG. 3 is an illustration of a main menu that may be presented in accordance with various embodiments of the present invention.

Turning to FIGS. 3-21, examples of user interfaces that may be presented to an operator of credit processor 114 via operator terminal 116 and/or workstations 102 and/or 104 are illustrated. As shown in FIG. 3, a main menu 300 is illustrated. Main menu 300 is illustrated with icons 301-311 which are supplemented by text, although main menu may be implemented in any suitable manner. Main menu 300 allows an operator to enter information for a new counterparty, search a list of counterparties, view and edit basic information for counterparties, view and edit financial information for counterparties, view and edit notes regarding to counterparties, view and edit a limits of counterparties, view position versus limit information for counterparties, view the current day's position information for counterparties, and view cumulative position information for counterparties by selecting icons 301, 302, 303, 304, 306, 307, 308, 309, and 310, respectively. Although the interfaces that are described below in connection with selecting these icons are explained as being presented to operators, certain of these interfaces may also be presented to counterparties under appropriate circumstances.

As mentioned above, by selecting icon 301 from menu 300, an operator can enter information for a new counterparty. As used herein, the term counterparty may be used to define any holder of a trading account irrespective of whether that account has sub-accounts or is a sub-account of another account. Turning to FIG. 4, an interface 400 that may be used to edit basic information for a counterparty is illustrated. As shown, interface 400 includes information areas 402, 404, 406, 408, and 410, and buttons 412, 414, 416, 418, and 420.

Within basic information area 402, an operator may view a counterparty identification number 422 (which is preferably selected by credit processor 112), view and select a credit status 424 (which may include frozen, active, closed, open and pending), view and enter a counter party name 426, view and enter a short name 428, view and enter a date that the counterparty was formed 430, view and select a country code for the counterparty 432, view and enter a tax identification number 434 for the counterparty, view and enter the number of branches 436 operated by the counterparty, view and select whether the counterparty is a parent entity or not 438, view and edit whether the counterparty has a parent entity 440 and, if so, view and select the name of the parent entity 442, and view the last date the information for the counterparty was modified 444 and the name of the operator that last modified the information 446.

If a parent entity is selected in box 440 and identified in field 442, information for that parent entity may appear in parent information area 406. As shown, this information may include an identification number 448, an entity classification 450, a name 452, a state 454, a country 456, and a geographical region 458.

Figure 5:
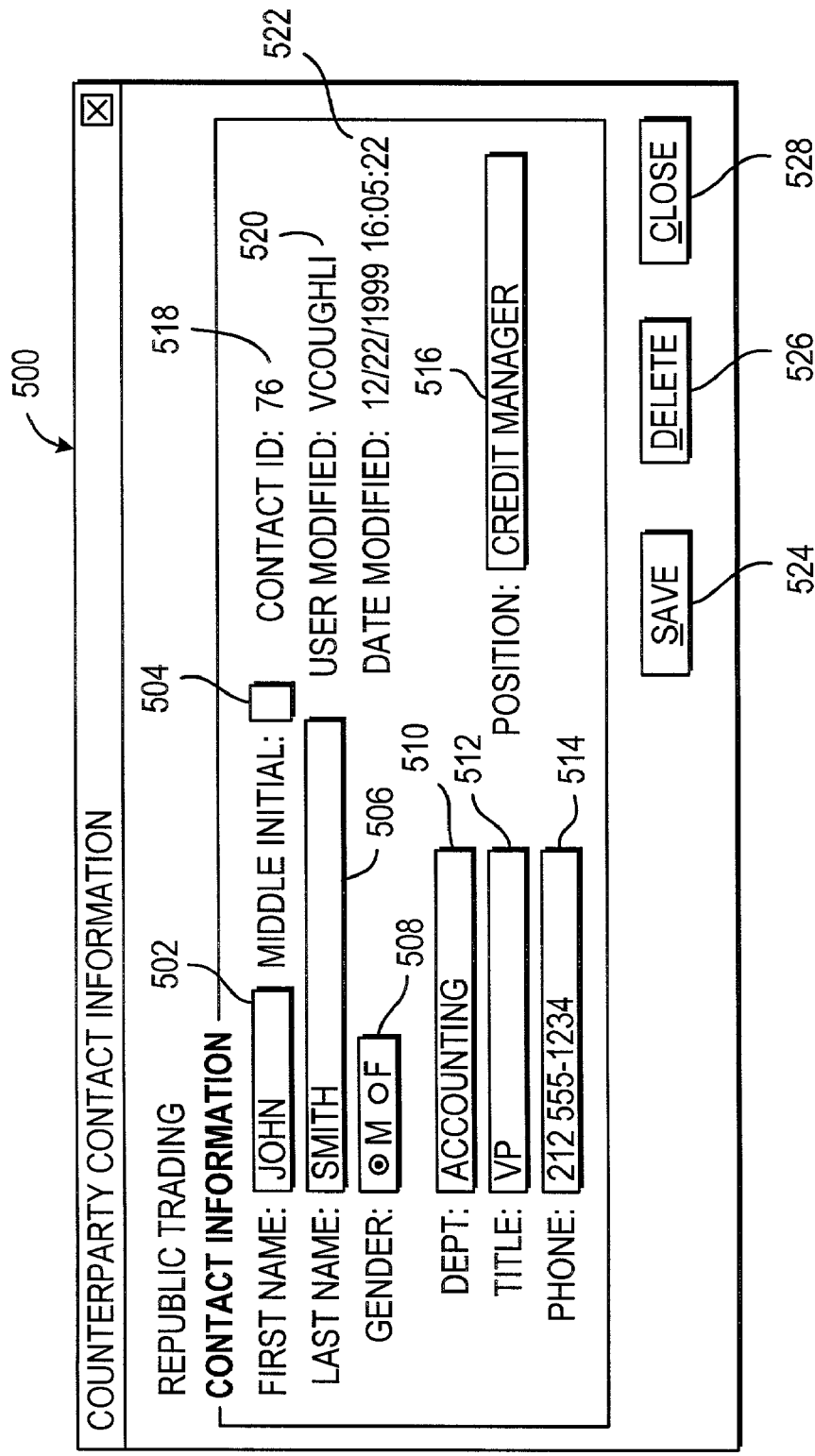

In order to enter contact information like that displayed in contact information area 404 of interface 400, an operator may click on contact button 414. Upon clicking on button 414, an interface 500 as illustrated in FIG. 5 may be presented. As shown, the operator may view and edit the contact's first name, middle initial, last name, gender, department, title, telephone number, and position in fields 502, 504, 506, 508, 510, 512, 514, and 516, respectively. The operator may also view the identification number 518 for the contact, which is preferably assigned by the credit processor, the name 520 of the operator that last modified the information for the contract, and the date and time 522 that the information for the contact was last modified. The operator may save the information for a contact by clicking save button 524. The operator may also disassociate a contact with a counterparty and delete the contact by pressing delete button 526. Finally, when an operator is done using interface 400, the operator may close the interface by clicking on close button 528.

Although not illustrated in a figure, an operator may use a similar interface to interface 500 to enter and edit the address information that is displayed in address information area 408 for a counterparty by initially clicking on address button 416 in interface 400.

Figure 6:
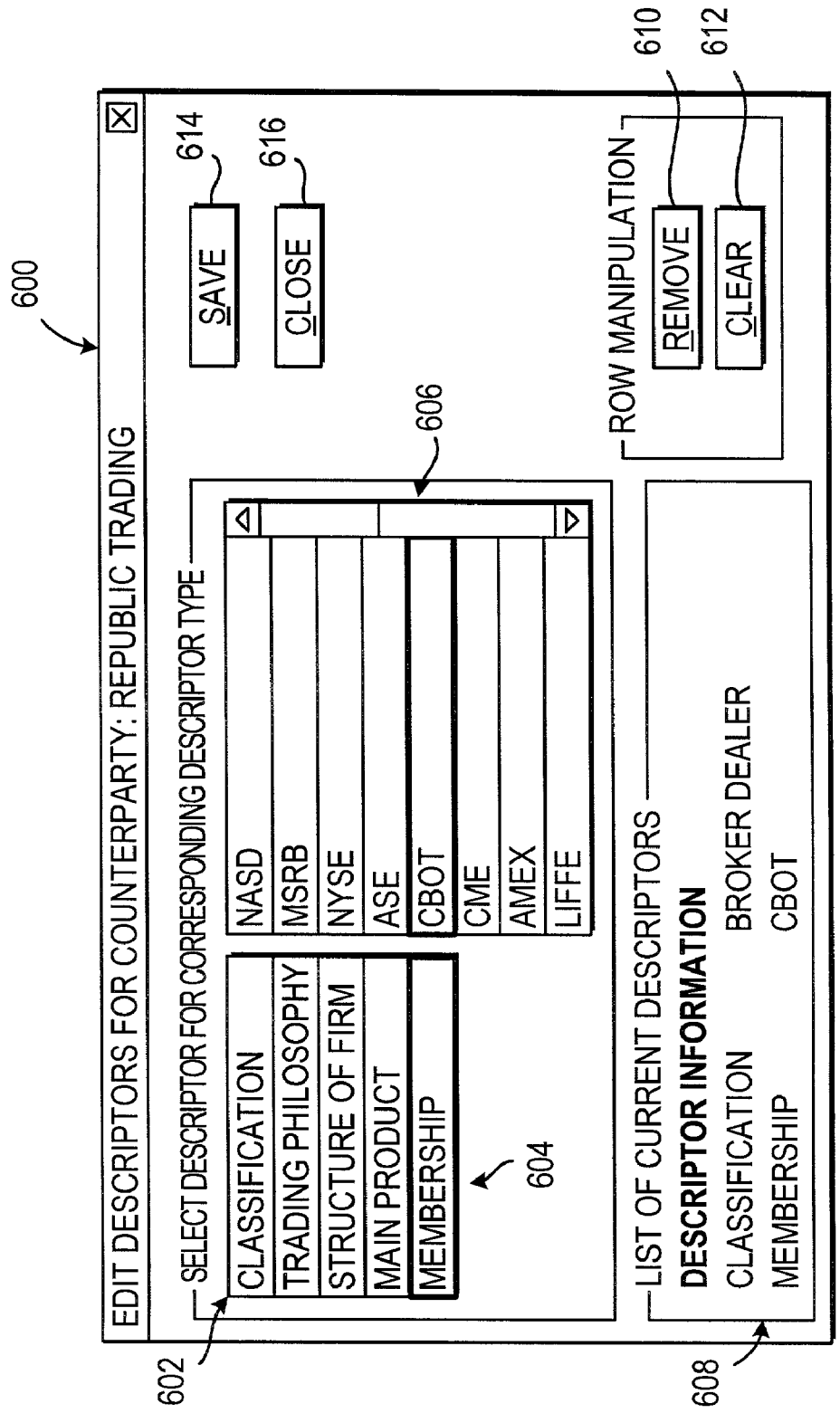

In order to enter and edit the description information that is displayed in description information area 410, an operator may click on descriptor button 418. Upon clicking on this button, the operator may be presented with an interface 600 as illustrated in FIG. 6. Within area 602 of interface 600, the operator may then select a descriptor type 604 that the operator wants to identify by clicking on the descriptor type. As shown, descriptor types may include classification, trading philosophy, structure of firm, main product, and membership. Once the operator has selected the descriptor type 604, a menu 606 of descriptors for that descriptor type may then be presented. For example, if the operator selects the membership descriptor type, menu 606 may include descriptors: NASD, MSRV, NYSE, ASE, CBOT, CME, AMEX, and LIFFE. If the operator selects the classification descriptor type, menu 606 may include descriptors: dealer, muni-dealer, broker-dealer, and customer. If the operator selects the trading philosophy descriptor type, menu 606 may include descriptors hedge fund and commercial bank. If the operator selects the structure-of-firm descriptor type, menu 606 may include descriptors: corporation, general partnership, chapter-S corporation, and limited liability partnership. If the operator selects the main product descriptor type, menu 606 may include descriptors: bonds, FX, IRO/IRS, and Repos. Obviously, certain descriptor types (which may be indicated by special coloring or in any other suitable manner), such as membership, may permit multiple descriptors to be selected, and others may only permit one descriptor to be selected. Multiple descriptor types may be defined for each counterparty.

When descriptor(s) 606 are selected for a descriptor type 604, the selections may then be displayed in a list of current descriptors area 608. In order to enable an operator to change the list of current descriptors, the operator may highlight a descriptor type and descriptor in list 608, and click remove button 610 or clear button 612. Remove button 610 preferably removes the descriptor type and descriptor from the list entirely, and clear button 612 preferably allows the operator to reenter the selections in area 602. Once the operator is done with interface 600, the operator may click on save button 614 to save the selections and/or close button 616 to close interface 600.

After an operator has completed using interface 400, the operator may click on save button 412 to save the selections and/or close button 420 to close interface 400.

Figure 7:
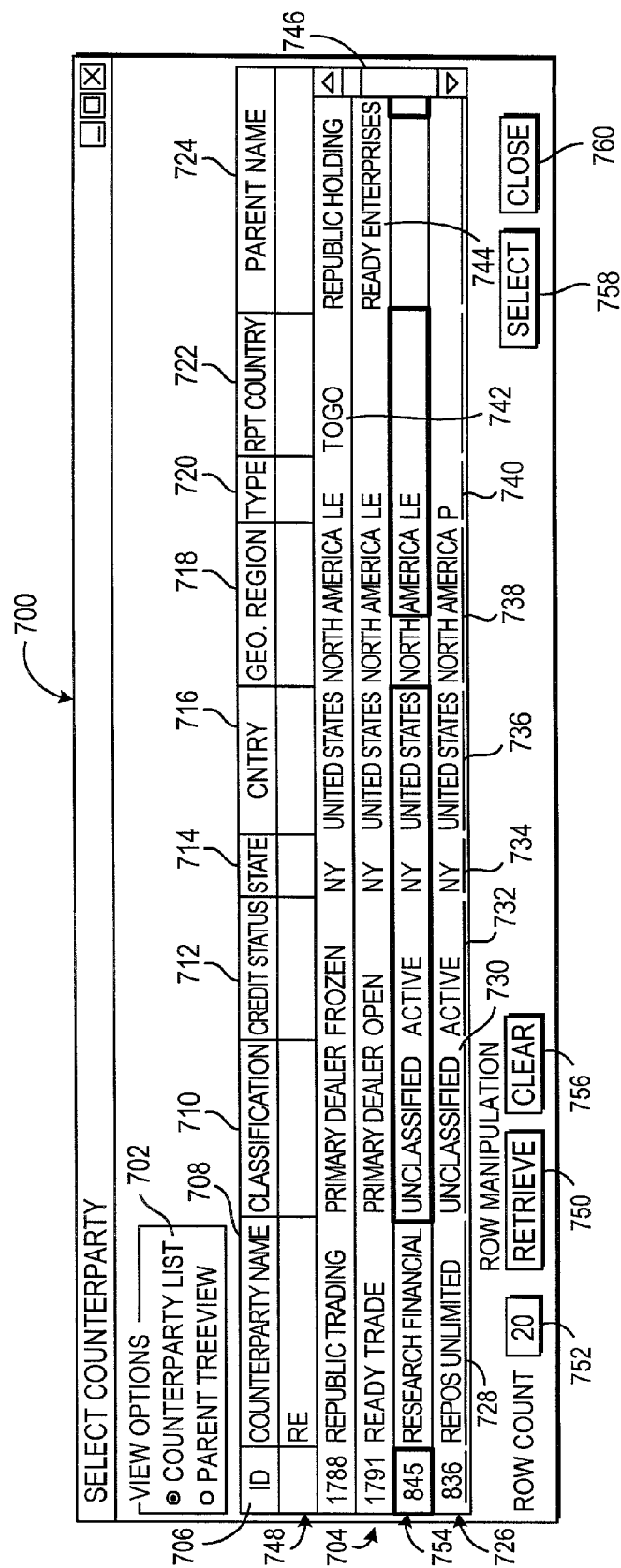
Figure 8:
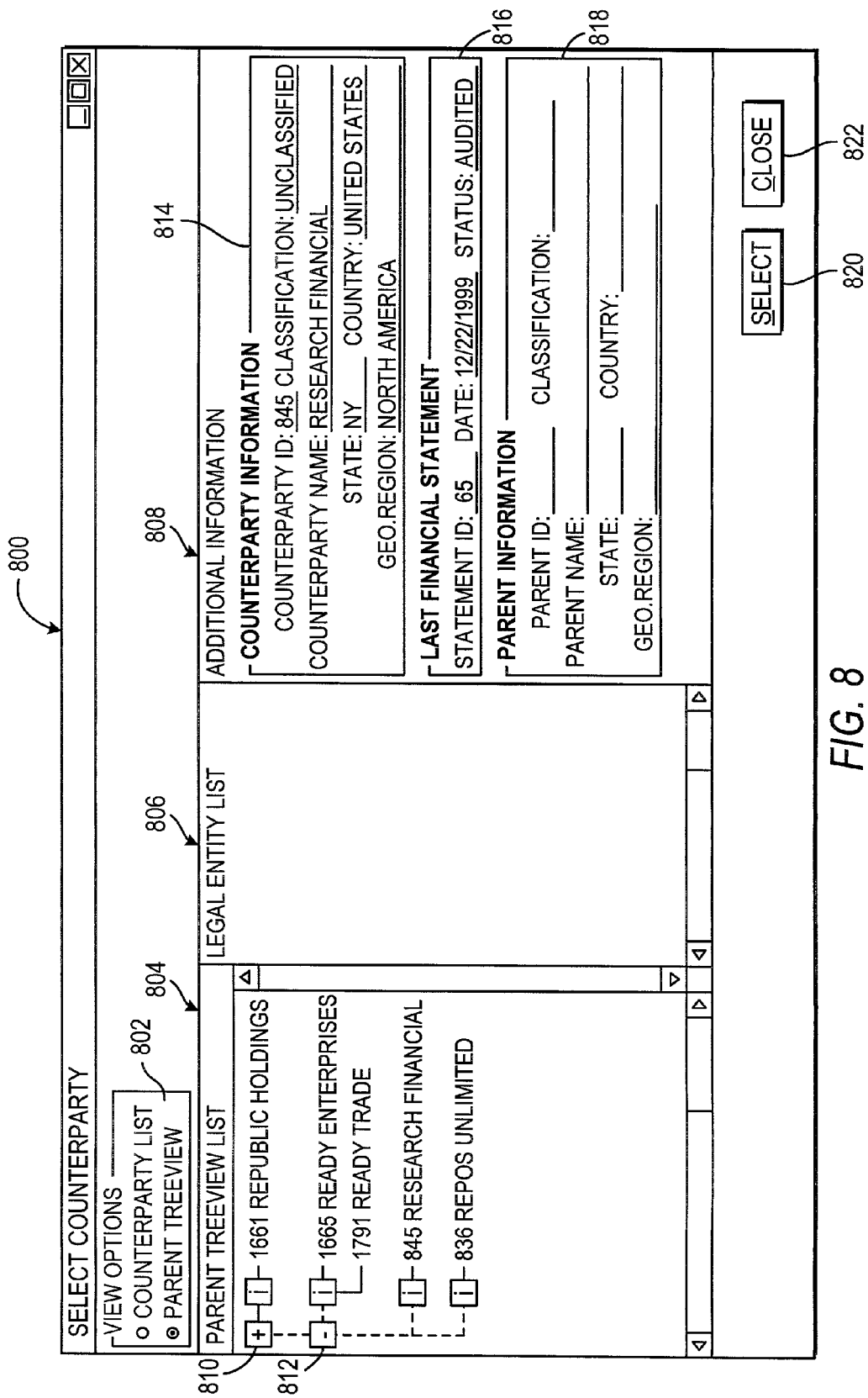

In order to search for and view counterparty information that has already been entered, an operator may click on search list icon 302 in main menu 300. After clicking on icon 302, select counterparty interfaces 700 and 800 may be presented as illustrated in FIGS. 7 and 8. As shown in FIG. 7, select counterparty interface 700 is shown with a counterparty list view option 702 selected. When in this view, counterparty information is displayed in a region 704 of the interface. This information may include an identification number 726, a name 728, a classification 730, a credit status 732, a state 734, a country 736, a geographic region 738, a type 740 (e.g., parent or legal entity), a country code 742, and a parent name 744 for the counterparty. Parent counterparties may be displayed in one color while non-parent counterparties may be displayed in another color.

The operator may scroll the list of information using scroll bar 746. The operator may also sort the information in the list by identification number 726, name 728, classification 730, credit status 732, state 734, country 736, geographic region 738, type 740, country code 742, and parent name 744 by selecting headings 706, 708, 710, 712, 714, 716, 718, 720, 722, and 724, respectively. Repeatedly selecting the same heading may toggle the order of the sort from ascending to descending and vice versa.

The operator may also restrict the items included in the list in region 704 by entering characters in one of fields 748 corresponding to identification number 726, name 728, classification 730, credit status 732, state 734, country 736, geographic region 738, type 740, country code 742, and parent name 744 and pressing retrieve button 750. For example, the letters "RE" have been entered in the one of fields 748 corresponding to name 728. Accordingly, only counterparties with names beginning with the letters "RE" are included in the list. The number of counterparties that are in the list may be indicated by row count field 752.

The operator may double click on any row in the list in order to activate interface 400 with that counterparty's information presented. The operator may also select a counterparty by clicking on a row so that a highlight region 754 appears in the row, and then clear the counterparty's information from the list by clicking on clear button 756 or select to activate interface 400 with that counterparty's information presented by clicking on select button 758. The operator may close interface 700 by clicking close button 760.

FIG. 8 illustrates select counterparty interface 800 with a parent tree view option 802 selected. Interface 800 may include three viewing windows 804, 806, and 808. In window 804, a parent tree view list may be presented. The list may include a list of counterparties, sub-counterparties of those counterparties, sub-sub-counterparties of the sub-counterparties, and so on. As illustrated, a plus sign 810 may be used to indicate a counterparty that has a sub-counterparty. In the case of "Republic Holdings", its sub-counterparty's identification number and name may be indicated by clicking on plus sign 810. Once this has been done, the plus sign may change to a minus sign 812 and the sub-counterparty's information may be indicated. In the case of "Ready Enterprises", its sub-counterparty is "Ready Trade". In the instance of counterparties where no sub-counterparty exists, these counterparties may be indicated without either a plus sign 810 or a minus sign 812 to indicate this status.

Once an operator has clicked on a counterparty in window 804, the sub-counterparties for that counterparty may also be listed in legal entity list window 806. At the same time, additional information for the clicked-on counterparty may be displayed in window 808. This additional information may include basic counterparty information 814, financial statement information 816, and parent information 818 (if applicable).

The operator may double click on any counterparty in the lists of windows 804 and 806 in order to activate interface 400 with that counterparty's information presented. The operator may also select a counterparty by clicking on that counterparty in the lists of windows 804 and 806 and click on select button 820 in order to activate interface 400 with that counterparty's information presented. The operator may close interface 800 by clicking close button 822.

Referring back to FIG. 3, selecting basic information icon 303 from main menu 300 may present interface 400 with the information for the counterparty that was last displayed in the interface. As explained above, the operator may then view and edit the information displayed.

From main menu 300, an operator may also select to view, enter, and edit financial statements for the last selected counterparty by clicking on financial information icon button 304. In response, financial statements interface 900 may be presented as illustrated in FIG. 9. As shown, interface 900 may contain a statement list 902 and a statement detail 904 for a selected statement in list 902. By clicking on a statement 906 so that the statement becomes highlighted, a corresponding statement detail 904 may be presented.

Figure 10:
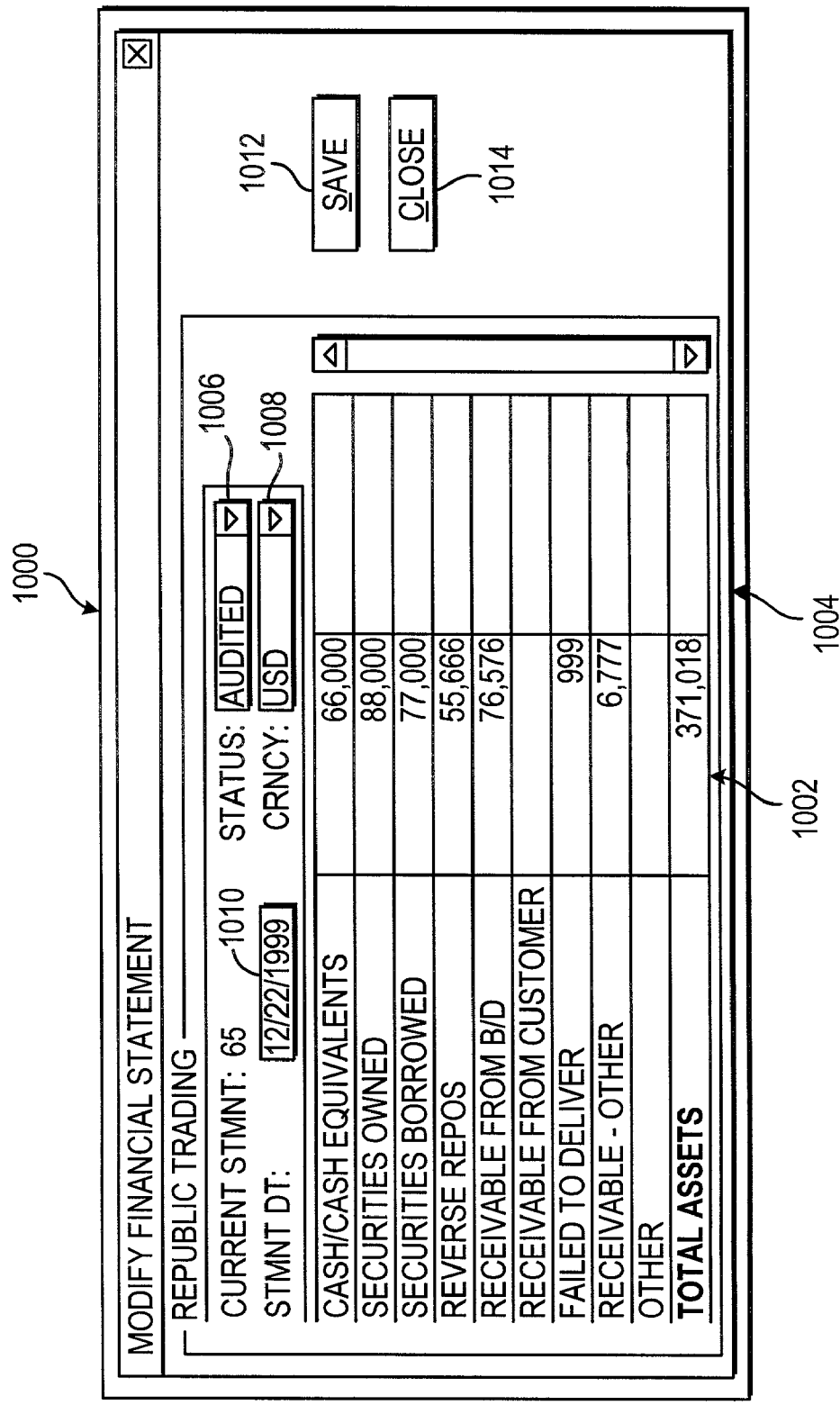

In order to modify the contents of a financial statement 906, the operator may click modify button 910. As shown in FIG. 10, upon clicking button 910, interface 1000 may be presented. Through interface 1000, the operator may edit the values in fields 1002, view the previous statement details in region 1004 if available (none shown), set the status 1006 for the financial statement (e.g., audited or unaudited), set the currency 1008 for the financial statement, and set the date 1010 for the financial statement (although, preferably the date cannot be altered once set). After the operator is satisfied with the settings in interface 1000, the operator may save the settings by clicking on save button 1012 and then close interface 1000 by clicking on close button 1014.

Similarly, from interface 900, an operator can create a new financial statement by clicking new button 912 and enter the pertinent information in interface 1000 of FIG. 10. By clicking on print button 914, an operator can print a financial statement. By clicking on save button 908, an operator can save one or more new financial statements or modifications to one or more financial statements. Finally, by clicking on close button 916, an operator can close interface 900.

Figure 11:
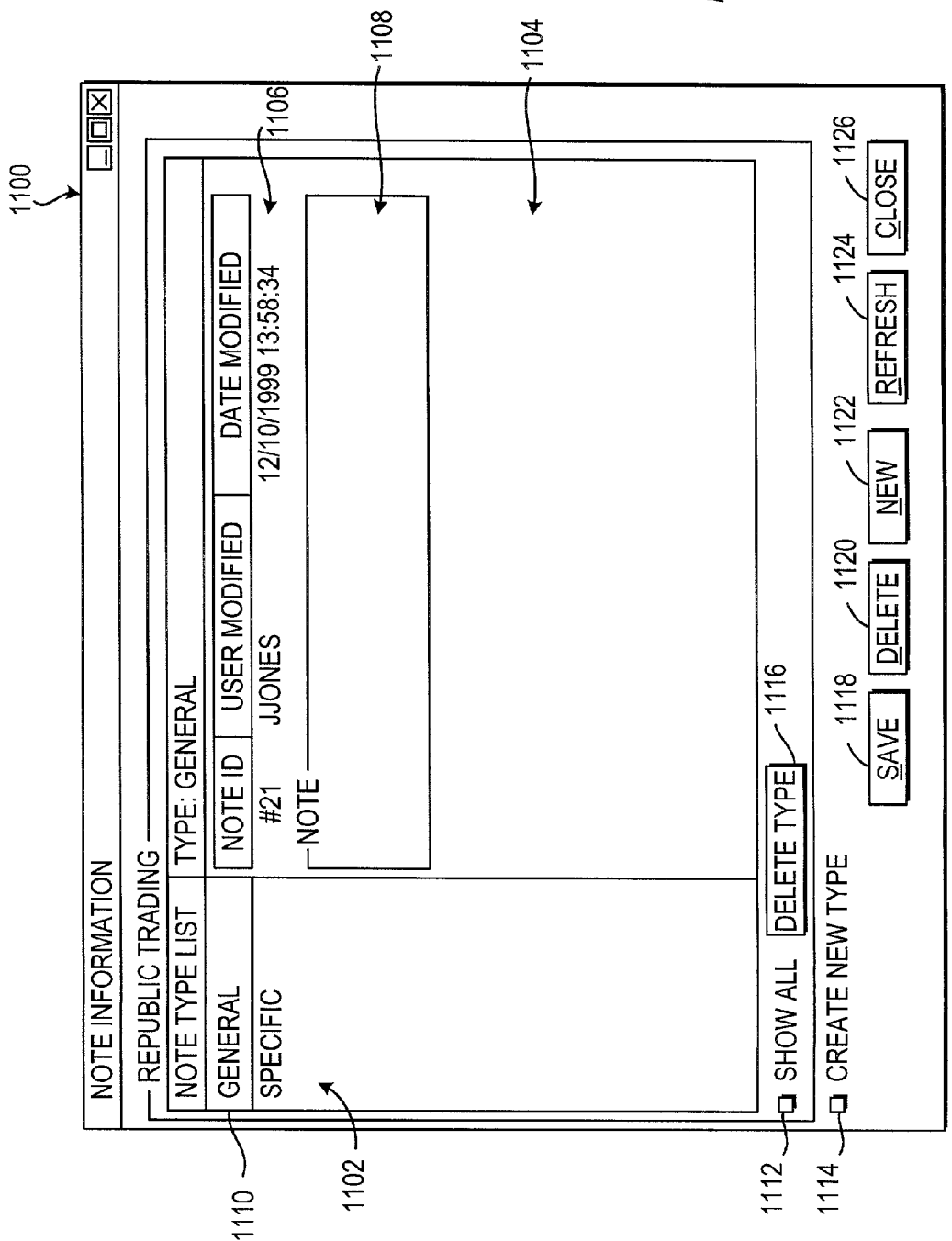

If the operator clicks on note icon 306 from main menu 300, a note information interface 1100 may be presented as illustrated in FIG. 11. As shown, interface 1100 includes a note type list 1102 and a notes area 1104. Note type list 1102 includes various types of notes that may be entered and displayed. Upon selecting a note type, such as note type 1110, notes area 1104 may display the corresponding notes 1108 for the selected type. Notes area 1104 may also present author information 1106 for the note which may include a note identification number, an operator name, and a date and time the note was created or modified. In order to show notes for all note types in list 1102, the operator may click on show all box 1112.

To create a new note type for list 1102, the operator may click on create new type box 1114. Upon doing so, a dialog box may appear prompting the operator to enter a name for the new note type. Once entered, the note type will preferably appear in list 1102. In order to delete a note type, the operator may select a note type in list 1102 and click on delete type button 1116. All notes related to that type may then be deleted, the user may be prompted whether each note is to be deleted or converted to another note type, or all notes may be converted to another note type.

By clicking on new button 1122, an operator may create a new note of the type selected. By clicking on delete button 1120, an operator may delete a selected note. By clicking on refresh button 1124, an operator can refresh the notes displayed in interface 1100. This may be particularly useful where more than one operator is entering notes for a given counterparty. By clicking on save button 1118, an operator can save newly created notes and modifications to notes. Finally, by clicking on close button 1126, an operator can close interface 1100.

Figure 12:
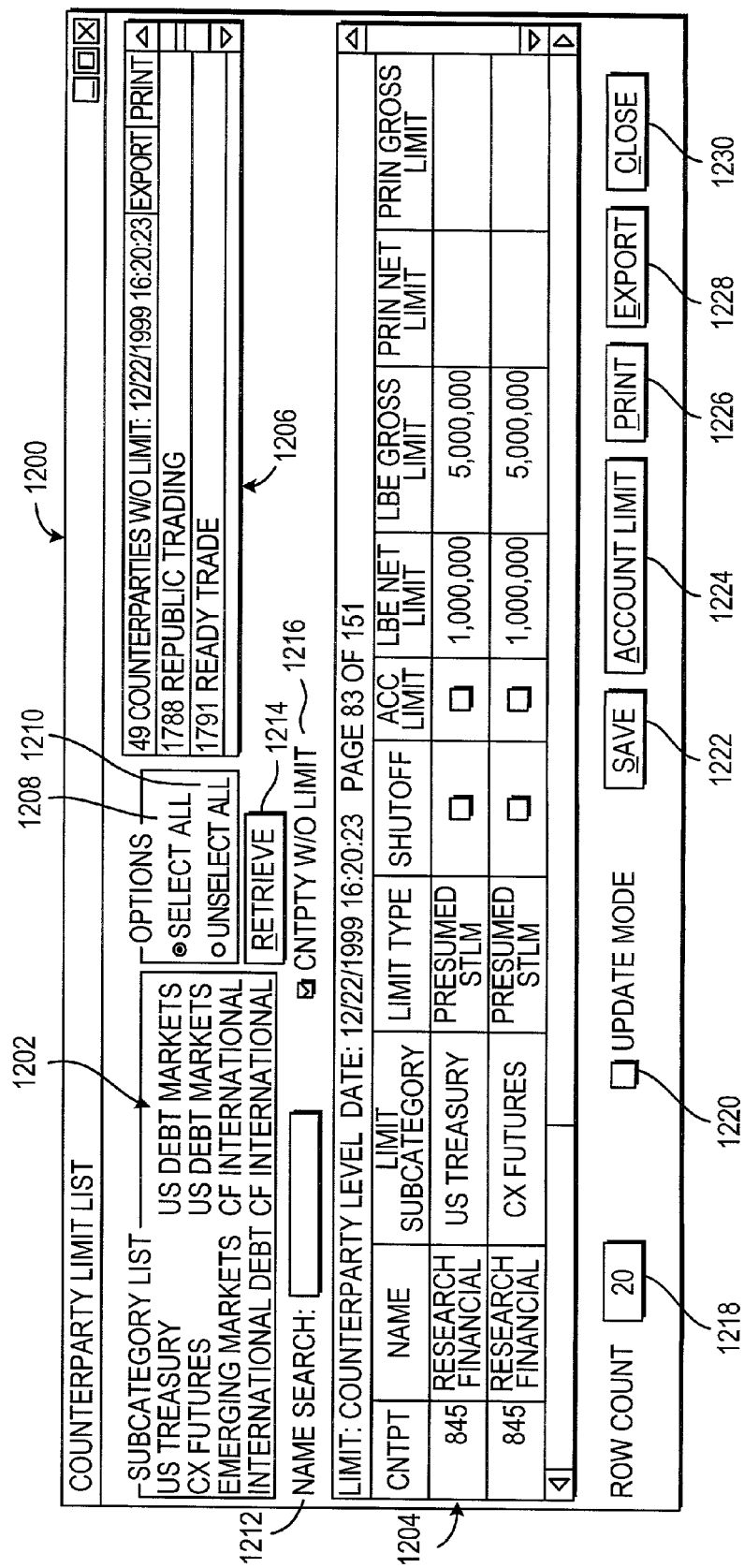

An operator may view credit limits for one or more counterparty accounts by clicking on limit list icon 307 in main menu 300 of FIG. 3. As shown in FIG. 12, an interface 1200 may then be displayed. Interface 1200 may include a subcategory list 1202 showing various trading markets in the trading system and a limit list 1204 showing credit limits for certain counterparty accounts. Subcategory list 1202 may be used to select trading markets in the trading system for which the operator would like to view trading limits in list 1204. As shown, all subcategories may be selected in list 1202. This may be accomplished by selecting radio button 1208. To unselect all subcategories, the operator may select radio button 1210. The operator may also restrict the counterparties listed in list 1204 by entering a name or a portion of a name in field 1212. To update the counterparty accounts shown in list 1204, retrieve button 1214 may be clicked. Row count 1218 may show the number of counterparty accounts listed in list 1204.

As shown, limit list 1204 may indicate a counterparty number for each account, a counterparty name for each account, a limit subcategory for each account, a limit type for each account, whether each account has been shut off, whether each account has reached its limit, the LBE net limit, the LBE gross limit, the principal net limit, the principal gross limit, the VAR net limit, the VAR gross limit, the MTM net limit, the MTM gross limit, and any other suitable information. In order to update this information, an operator may click on update mode box 1220 and enter the desired changes in list 1204.

To view the account limits for a particular counterparty, the operator may select the counterparty from list 1204 and then click on account limit button 1224. In response, account limit list interface 1300 may be presented. Interface 1300 may list all account level limits for a counterparty in list 1302, the counterparty level limits for the counterparty in region 1304, and accounts which do not have their own limits and which are therefore subject to the counterparty level limits for the counterparty. An operator may update the limits indicated for accounts in list 1302 by clicking on update mode box 1308 and changing the values in the fields of list 1302.

A new account limit may be added to list 1302 by clicking on new button 1312, or an existing account limit may be modified by clicking on modify button 1311. After an operator clicks on button 1312 or 1311, a limit entry interface 1400 may be presented as illustrated in FIG. 14. By selecting and modifying the various fields 1402, the operator may the set the account limits and other parameters to the desired settings. The operator may then save the new settings by clicking on save button 1404. The operator may close interface 1400 by clicking on close button 1406.

By clicking on button 1314, the operator may refresh the information displayed in interface 1300. By clicking on print button 1316, the operator may print out the information displayed in interface 1300. By clicking on export button, 1318, the operator may export the information displayed in interface 1300 to a data file. By clicking on save button 1310, the operator may save an changes or additions made to the limits or other parameters displayed in interface 1300. Finally, by clicking on close button 1320, the operator may close interface 1300.

Turning back to interface 1200 of FIG. 12, as illustrated, interface 1200 may also include a counterparty-without-limit list 1206 showing counterparties for which no limits have been set for the selected trading markets. These counterparties may not be eligible to trade in those trading markets because no limits have been set. Counterparty-without-limit list 1206 may be displayed by clicking on counterparty-without-limit box 1216.

By clicking on print button 1226, the operator may print out the information in interface 1200. By clicking on export button 1228, the operator may export the information in interface 1200 to a data file. By clicking on save button 1222, the operator may save any additions or modifications to the information displayed in interface 1200. Finally, by clicking close button 1230, the operator may close interface 1200.

In order to view position versus limit information for one or more counterparties in one or more trading markets of the trading system, an operator may click on position versus limit icon 308 of main menu 300 of FIG. 3. Upon selecting icon 308, position versus limit interface 1500 of FIG. 15 may be displayed. Interface 1500 may include a list 1502 of trade information for each counterparty corresponding to a category and one or more subcategories selected in fields 1504 and 1506, respectively. By clicking on radio buttons 1508 and 1510 and then clicking on retrieve button 1512, the operator may respectively select and unselect all of the categories and subcategories in fields 1504 and 1506 and then view the results in list 1502. The values in list 1502 may then be updated either manually or automatically by selecting one of the radio buttons in refresh settings 1514.

As shown in interface 1500, list 1502 may include for each counterparty a counterparty identification number, a counterparty name, a limit type, a new limit type, a limit subcategory, whether the counterparty has been shut off, the percentage of the limit for initial warning, the quantity of trades executed, the LBE net position, the LBE net limit, and the percentage of the LBE net limit reached so far.

As with all position related interfaces and limit related interfaces, the information presented may be presented in white when the counterparty's accounts are in good standing, in yellow when the accounts are over their warning limits, and in red when the accounts are over their credit limit.

To view position versus limit information for all of a particular counterparty's accounts in a particular subcategory, an operator may select a set of counterparty accounts in the selected subcategory in list 1502 and then click on account button 1516. Upon clicking on account button 1516, position versus account detail interface 1600 may be presented as shown in FIG. 16. As illustrated, this interface may include a list of accounts 1602 for the selected counterparty and subcategory 1601. This list may indicate for each account the account number, the account name, the active status, the shut off status, the warning limit percentage, the quantity of trades so far, the LBE net position, the LBE net limit, the percentage of the LBE net limit, the LBE gross position, and the LBE gross limit. The operator may close interface 1600 by clicking on close button 1604.

To view position versus limit information for all transactions in a particular subcategory for a particular counterparty, an operator may select a set of counterparty accounts in the selected subcategory in list 1502 and then click on transaction button 1518. Upon clicking on transaction button 1518, position versus limit interface 1700 may be presented as shown in FIG. 17. As illustrated, this interface may include a list of transactions in a selected subcategory 1704 for a selected counterparty. For each transaction, this list may indicate particulars of the transaction including the quantity, the LBE, the principal, the price, and whether the transaction was a buy or sell. By clicking on close button 1706, the operator may close interface 1700.

Referring back to FIG. 15, once the operator is done using interface 1500, the operator may close the interface by clicking on close button 1520.

In order to view position information for the current trading day, an operator may click on today's position icon 309 from main menu 300 of FIG. 3. As shown in FIG. 18, an interface 1800 may then be presented. Upon selecting a category and one or more subcategories in fields 1804 and 1806, the operator may view a list of position information for each counterparty participating in the trading markets corresponding to the selected category and subcategories. This information may include the counterparty identification number, the counterparty name, the subcategory, the quantity, LBE net position, the LBE gross position, the LBE long position, the LBE short position, etc. To view position information for each of a counterparty's accounts in a selected subcategory, an operator may select the desired counterparty and category in list 1802 and click on account button 1808. Upon clicking on button 1808 a list 1902 showing the current trading day's position information for the corresponding accounts may be presented in an interface 1900. Each of interfaces 1800 and 1900 may be closed by pressing close buttons 1810 and 1904.

In order to view cumulative position information, an operator may click on cumulative position icon 310 from main menu 300 of FIG. 3. As shown in FIG. 20, an interface 2000 may then be presented. Upon selecting a category and one or more subcategories in fields 2004 and 2006, the operator may view a list of cumulative position information for each counterparty participating in the trading markets corresponding to the selected category and subcategories. This information may include the counterparty identification number, the counterparty name, the subcategory, the quantity, LBE net position, the LBE gross position, the LBE long position, the LBE short position, etc. To view cumulative position information for each of a counterparty's accounts in a selected subcategory, an operator may select the desired counterparty and category in list 2002 and click on account button 2008. Upon clicking on button 2008 a list 2102 showing the cumulative position information for the corresponding accounts may be presented in an interface 2100. Each of interfaces 2000 and 2100 may be closed by pressing close buttons 2010 and 2104.

Those skilled in the art will appreciate that the present invention can be practiced by other than the described embodiments, which are presented for purposes of illustration and not of limitation, and the present invention is limited only by the claims which follow.

What is claimed is:

1. A method, comprising:
   accumulating, by at least one processor, values of trades by a trader in a trading market to obtain an accumulated position for the trader;
   comparing, by the at least one processor, the accumulated position for the trader with a trading limit assigned against the trader for the trading market;
   determining, by the at least one processor, whether the accumulated position for the trader exceeds the trading limit; and
   shutting off, by the at least one processor for the trader, an ability to trade in the trading market when the accumulated position for the trader exceeds the trading limit.

2. The method of claim 1, further comprising:
   adjusting, by the at least one processor, the accumulated position for the trader based upon at least one of:
   a trade that cleared, and
   a trade that failed to clear.

3. The method of claim 1, in which accumulating the values of the trades comprises accumulating the values of the trades by the trader based upon long-bond-equivalents of the trades.

4. The method of claim 1, further comprising causing, by the al least one processor, a message to be sent when shutting off, for the trader, the ability to trade.

5. The method of claim 1, further comprising comparing, by the at least one processor, the accumulated position for the trader with a trading warning level.

6. The method of claim 1, in which shutting off, for the trader, the ability to trade comprises disabling a trading account of the trader.

7. The method of claim 1, further comprising:
determining, by the at least one processor, whether the trading limit exists for the trader; and
performing, by the at least one processor, the comparing and shutting off steps when the trading limit exists for the trader.

8. The method of claim 1, further comprising:
accumulating, by the at least one processor, the values of the trades with a position for a parent entity of the trader to obtain an accumulated position for the parent entity;
comparing, by the at least one processor, the accumulated position for the parent entity with a trading limit for the parent entity;
determining, by the at least one processor, whether the accumulated position for the parent entity exceeds the trading limit for the parent entity; and
shutting off, by the at least one processor for a plurality of traders under the parent entity, an ability to trade in the trading market when the accumulated position for the parent entity exceeds the trading limit for the parent entity.

9. The method of claim 8, in which the accumulated position for the parent entity is based upon long-bond-equivalents of the trades.

10. The method of claim 8, further comprising shutting off, by the at least one processor for the parent entity, an ability to trade in the trading market when the accumulated position for the parent entity exceeds the trading limit for the parent entity.

11. The method of claim 8, further comprising:
comparing, by the at least one processor, the accumulated position for the parent entity with a trading warning level.

12. The method of claim 8, in which the accumulated position for the trader and the accumulated position for the parent entity are related to bonds.

13. The method of claim 8, in which the accumulated position for the parent entity comprises trades by the plurality of traders under the parent entity.

14. The method of claim 1, in which the trades have not been verified as cleared.

15. The method of claim 1, in which the accumulated position for the trader comprises a gross position.

16. The method of claim 1, in which the accumulated position for the trader comprises a net position.

17. The method of claim 1, in which shutting off, for the trader, the ability to trade comprises shutting off a trading account of the trader.

18. The method of claim 1, in which shutting off, for the trader, the ability to trade comprises at least one of:
shutting off a trading account of the trader, and
disabling the trading account of the trader.

19. An apparatus comprising at least one processor configured to:
accumulate values of trades by a trader in a trading market to obtain an accumulated position for the trader,
compare the accumulated position for the trader with a trading limit assigned against the trader for the trading market,
determine whether the accumulated position for the trader exceeds the trading limit, and
shut off, for the trader, an ability to trade in the trading market when the accumulated position for the trader exceeds the trading limit.

20. The apparatus of claim 19, in which the at least one processor is further configured to adjust the accumulated position for the trader based upon at least one of:
a trade that cleared, and
a trade that failed to clear.

21. The apparatus of claim 19, in which to accumulate the values of the trades comprises to accumulate the values of the trades by the trader based upon long-bond-equivalents of the trades.

22. The apparatus of claim 19, in which the at least one processor is further configured to cause a message to be sent when the ability to trade has been shut off for the trader.

23. The apparatus of claim 19, in which the at least one processor is further configured to:
compare the accumulated position for the trader with a trading warning level; and
cause a message to be sent when the accumulated position for the trader exceeds the trading warning level.

24. The apparatus of claim 19, in which to shut off, for the trader, the ability to trade comprises to disable a trading account of the trader.

25. The apparatus of claim 19, in which to shut off, for the trader, the ability to trade comprises to shut off a trading account of the trader.

26. The apparatus of claim 19, in which the at least one processor computing device is further operable configured to:
accumulate the values of the trades with a position for a parent entity of the trader to obtain an accumulated position for the parent entity;
determine whether the trading limit exists for the trader;
perform the comparing and shutting off operations when the trading limit exists for the trader;
determine whether a trading limit exists for the parent entity; and
when the trading limit exists for the parent entity, compare the accumulated position for the parent entity with the trading limit for the parent entity, determine whether the accumulated position for the parent entity exceeds the trading limit for the parent entity, and shut off, for at least the trader, the ability to trade in the trading market when the accumulated position for the parent entity exceeds the trading limit for the parent entity.

27. The apparatus of claim 26, in which the accumulated position for the parent entity is based upon long-bond-equivalents of the trades.

28. The apparatus of claim 26, in which the at least one processor is further configured to shut off, for at least the trader, the ability to trade in the trading market when the trading limit does not exist for the parent entity.

29. The apparatus of claim 26, in which the at least one processor is further configured to shut off, for the parent entity, an ability to trade in the trading market when the accumulated position for the parent entity exceeds the trading limit for the parent entity.

30. The apparatus of claim 26, in which the at least one processor is further configured to:
compare the accumulated position for the parent entity with a trading warning level; and cause a message to be sent when the accumulated position for the parent entity exceeds the trading warning level.

31. The apparatus of claim 26, in which the accumulated position for the trader and the accumulated position for the parent entity are related to bonds.

32. The apparatus of claim 19, in which the trades have not been verified as cleared.

33. A method, comprising:
   accumulating, by at least one processor, a value of a conducted trade by a trader in a trading market with a value of at least one trade previously conducted by the trader in the trading market to obtain an accumulated position for the trader;
   comparing, by the at least one processor, the accumulated position for the trader with a trading limit assigned against the trader for the trading market;
   determining, by the at least one processor, whether the accumulated position for the trader exceeds the trading limit; and
   shutting off, by the at least one processor for the trader, an ability to trade in the trading market when the accumulated position for the trader exceeds the trading limit.

34. The method of claim 33, further comprising:
   accumulating, by the at least one processor, the value of the conducted trade with a position for a parent entity of the trader to obtain an accumulated position for the parent entity;
   comparing, by the at least one processor, the accumulated position for the parent entity with a trading limit for the parent entity;
   determining, by the at least one processor, whether the accumulated position for the parent entity exceeds the trading limit for the parent entity; and
   shutting off, by the at least one processor for a plurality of traders under the parent entity, an ability to trade in the trading market when the accumulated position for the parent entity exceeds the trading limit for the parent entity.

35. The method of claim 34, in which the accumulated position for the parent entity comprises conducted trades by the plurality of traders under the parent entity.

36. The method of claim 33, in which the conducted trade and the at least one previously conducted trade have not been verified as cleared.

37. The method of claim 33, in which the accumulated position for the trader comprises a gross position.

38. The method of claim 33, in which the accumulated position for the trader comprises a net position.

39. The method of claim 33, in which shutting off, for the trader, the ability to trade comprises at least one of:
   shutting off a trading account of the trader, and
   disabling the trading account of the trader.

40. A method comprising:
   accumulating, by at least one processor, values of trades by a plurality of traders in a trading market to obtain an accumulated position, in which the plurality of traders are associated with a parent entity;
   determining, by the at least one processor, whether the accumulated position exceeds a trading limit assigned against the parent entity for the trading market; and
   shutting off, by the at least one processor for the plurality of traders, an ability to trade in the trading market when the accumulated position exceeds the trading limit.

41. The method of claim 40, in which the accumulated position comprises a net position.

42. The method of claim 40, in which the trades have not been verified as cleared.

43. The method of claim 40, in which accumulating the values of the trades comprises adjusting the accumulated position based upon at least one of the trades clearing.

* * * * *